United States Patent [19]

Holle et al.

[11] 4,181,412

[45] Jan. 1, 1980

[54] OPTICAL EXPOSURE MEASURING SYSTEM FOR PHOTOGRAPHIC CAMERAS

[75] Inventors: Werner Holle, Wetzlar; Dietrich Bruckner, Nauborn, both of Fed. Rep. of Germany

[73] Assignee: Ernst Leitz Wetzlar GmbH, Wetzlar, Fed. Rep. of Germany

[21] Appl. No.: 877,881

[22] Filed: Feb. 15, 1978

Related U.S. Application Data

[63] Continuation-in-part of Ser. No. 762,645, Jan. 26, 1977, abandoned.

[30] Foreign Application Priority Data

Feb. 14, 1976 [DE] Fed. Rep. of Germany ....... 2605955

[51] Int. Cl.$^2$ .......................... G03B 7/08; G03B 19/12
[52] U.S. Cl. .................................... 354/23 R; 354/56
[58] Field of Search ...................... 354/55, 56, 59, 155, 354/23 R

[56] References Cited

U.S. PATENT DOCUMENTS

| | | | |
|---|---|---|---|
| 3,093,044 | 6/1963 | Lederer | 354/55 |
| 3,332,331 | 7/1967 | Mandler | 354/55 |
| 3,429,246 | 2/1969 | Ebertz | 354/55 |
| 3,638,548 | 2/1972 | Kurihara | 354/55 |
| 3,690,240 | 9/1972 | Gold | 354/155 |

FOREIGN PATENT DOCUMENTS 2226904 12/1973 Fed. Rep. of Germany ........ 354/23 R

*Primary Examiner*—John Gonzales
*Attorney, Agent, or Firm*—Gilbert L. Wells

[57] ABSTRACT

An optical system for the metering of illumination in photographic cameras, in particular mirror-reflex cameras, which makes use of a photodetector with a light-sensitive surface small in comparison to the image area to be metered and which is mounted in the lower camera space. A honeycomb mirror consisting of a multitude of convex or concave mirror elements is mounted behind the reflex-mirror which is partly transmitting. The honeycomb mirror when it is in the metering position is located in front of the film plane and is moved together with the reflex-mirror out of the way of the beam path before the picture is taken, the mirror elements of the honeycomb mirror being slanted so that the center of every individual element reflects the principal rays toward the photodetector. The curvature of the mirror elements is such that the outermost peripheral rays from the objective are reflected from the rims of the mirror elements toward the photodetector.

7 Claims, 6 Drawing Figures

OPTICAL EXPOSURE MEASURING SYSTEM FOR PHOTOGRAPHIC CAMERAS

The present application is a continuation-in-part application of our earlier U.S. application Ser. No. 762,645 filed on Jan. 26, 1977, now abandoned.

BACKGROUND OF THE INVENTION

The field of the invention is the use of photo-electric light responsive devices in Photography.

The present invention is particularly concerned with an optical system for measuring exposure in photographic cameras, in particular in mirror-reflex cameras, and comprising a light detector of which the light-sensitive surface is small compared to the image area.

The state of the art of exposure measuring devices in reflex cameras may be ascertained by reference to U.S. Pat. No. 3,468,233, the disclosure of which is incorporated herein.

Essentially two types of systems for measuring exposure are known as regards mirror-reflex cameras. One of them makes use of one or two photodetectors which are located laterally at the exit surface of the pentaprism next to the viewing ocular. The measurements so obtained are integrated over the entire image surface, or else they emphasize the middle, or are "center-weighted". The actual weighting of the individual image parts in practice depends on the dispersion/or scattering characteristics of the focusing screen and of that of the aperture used for such measurements. Furthermore, the illumination intensity incident on the photodetector(s) fails to be sufficiently proportional to the stop aperture.

As regards the other type of system, the photodetector is mounted in the lower camera space and is illuminated by means of an auxiliary mirror mounted behind the reflex mirror as disclosed in U.S. Pat. No. 3,468,233. This arrangement performs spot measurements, and both a precise aperture-dependence and a satisfactory spot definition are obtained.

However, photoresistors are used in the latter case as detectors which to a first approximation determine the spot size by their light-sensitive surface. Efforts are underway at the present to replace the photo-resistors (frequently called CdS cells) by silicon photocells (or silicon photo-diodes), which are more stable with time. However, the prices of such Si cells increase enormously with photosensitive size, and this requires making do with cells no larger than a few square millimeters.

SUMMARY OF THE INVENTION

Having the limitations of the prior art in mind, it is an object of the present invention to provide an optical system using a photodetector of small photo-sensitive area in comparison with the image area and to achieve precise proportionality between the current of the photodetector and the stop-aperture at optimum photo-technical efficiency. This system achieves not only a spot measurement of adequate size, but also is applicable to partly integrated image measurements from 10 ... to ... 50% of the image field. As is known, a spot measurement of the prospective photograph requires selection of a suitable image segment ("aiming", "fitting"), while integrated or partly integrated measurements are more advantageous for snap shots with automatic exposure controls. It has been found very advantageous indeed to select a partial measurement of 20 to 50%, this segment of the image area preferably being somewhat off-center and down.

The present invention achieves the above object by mounting a honeycomb mirror consisting of a multitude of convex or concave mirrors behind the partly transmitting reflex mirror known in the prior art, the honeycomb mirror being located closely in front of the film plane when in the measuring position, and being flipped out of the image rays' path together with the reflex mirror prior to picture-taking, the honeycomb mirror's elements being so slanted that it will be the center of each individual element which shall reflect the main rays to the photodetector, the curvature (of the elements) being such that the outermost peripheral rays from the objective are reflected from the rim of the mirror elements to the photodetector.

The system of the present invention achieves constant proportionality between the partial areas employed of the individual mirror elements and the relative stop-aperture, so that in spite of a light-sensitive surface small in comparison to the image area to be metered, there will be precise dependence of the photo-current on the stop-aperture.

Should it be desired to have the option to switch from a spot measurement in the rigorous sense to a larger one, i.e. a partial integrated measurement, the present invention proposes furthermore that the honeycomb mirror be subdivided into a smaller and approximately centrally mounted mirror part and into a larger one, which latter may be selectively hooked up to the smaller one, the larger surrounding the smaller one in the shape of a U. When only the small mirror part is operative, a spot measurement covering for instance from 5 to 10% of the image field to be metered is obtained, whereas if both parts are operative, the image field to be metered is covered from about 10 to 50%.

BRIEF DESCRIPTION OF THE DRAWINGS

The present invention is best described by reference to the appending drawings showing several embodiments of the invention, wherein.

DESCRIPTION OF THE PREFERRED EMBODIMENTS

Figure 1:
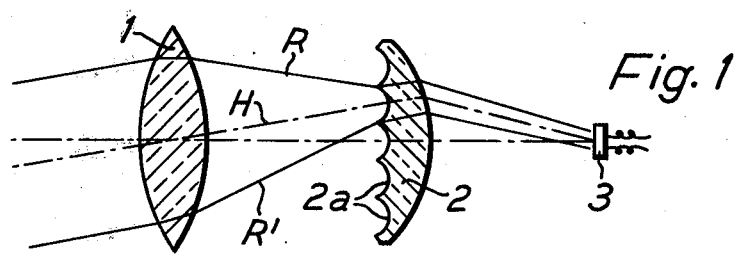
FIG. 1 is a side view in diagrammatic form of the present invention, the rays being stretched for clarity.

FIG. 1 shows objective 1 in schematic form. A honeycomb lens 2 is shown here in lieu of a honeycomb mirror, and photodetector 3 is of nearly point-design. The principal ray H is refracted by the center of an upper cup 2a of the honeycomb lens on its way to photodetector 3. Similar refraction takes place for the peripheral rays R and R' from the rim of the cup 2a to photodetector 3. It is seen that the proposed achievement of the object of the invention is feasible because of a compromise, namely by allowing omission of some image points when setting the stop-aperture of objective 1 from metering and metering instead increasingly smaller circular partial areas. Such a restriction is wholly admissible in the light of the above research. The honeycomb lens also may comprise convex individual lenses, for which case the rays shown would intersect. Again a combination of convex and concave lenses of undulatory cross-section may be used.

Figure 2:
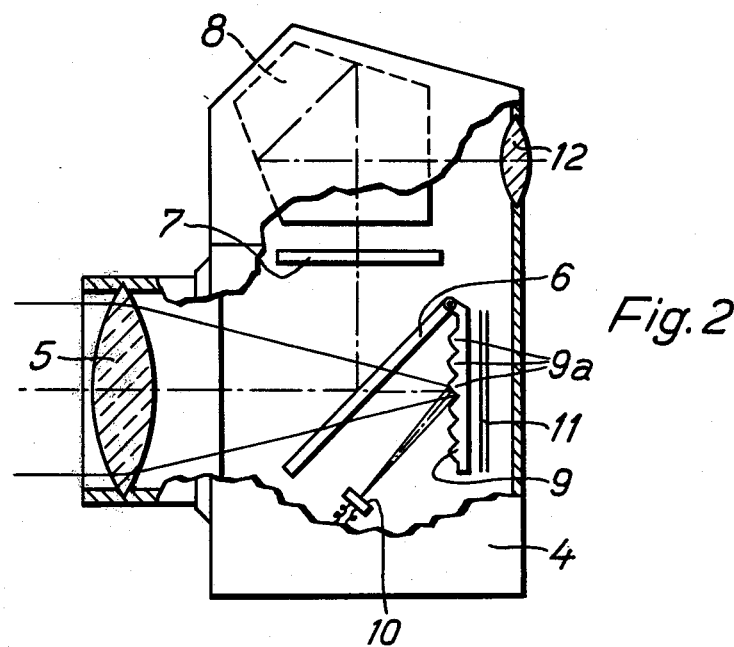
FIG. 2 is a schematic cross-sectional side view showing the honeycomb mirror in a first embodiment and mounted in a mirror-reflex camera.

FIG. 2 shows the concept of FIG. 1 applied concretely to a mirror reflex camera. Camera 4 is provided with an objective 5 and reflex mirror 6, focusing plate 7 and pentaprism 8. The upper end of reflex mirror 6 is pivotally mounted on pivot means in the housing of the camera 4. The honeycomb lens shown in FIG. 1 is designed in this case as honeycomb mirror 9 comprising small convex specular honeycombs 9a and having its upper end hinged to the pivot means bearing the reflex mirror 6. Photodetector 10 is mounted at the bottom of the camera and it receives the rays reflected by honeycombs 9a. For the metering position, the honeycomb mirror is located in front of shutter 11. Honeycomb mirror 9 during picture-taking is in the lifted position together with reflex mirror 6, the latter being partly transmitting so that the light reaches honeycomb mirror 9 during exposure-metering. Honeycomb mirror 9 is opaque on its back so that no light may reach the film through viewer ocular 12 and pentaprisma 8 while the picture is being taken. The size of the honeycomb mirror 9 determines the metered area. The latter is purposely made asymmetrical to the optical axis because of the knowledge that the metered segment should be shifted down somewhat, and furthermore, the design and beam guidance is facilitated thereby.

Figure 3:
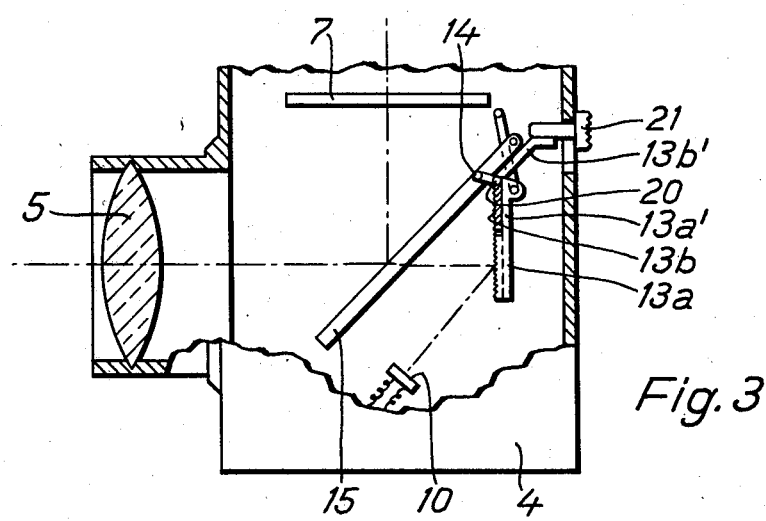
FIG. 3 is a schematic cross-sectional side view showing the honeycomb mirror in a second embodiment and mounted in a reflex-mirror camera, the honeycomb mirror being subdivided into a smaller central mirror and a larger surrounding mirror, both mirrors in metering position.
Figure 4:
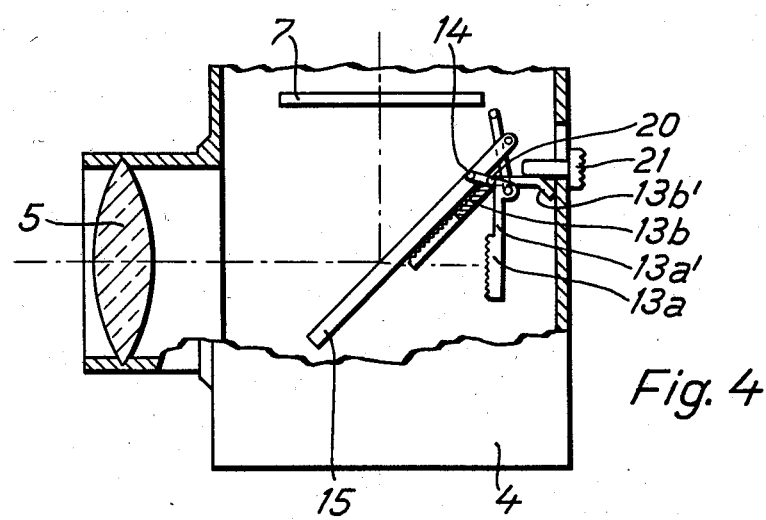
FIG. 4 shows the honeycomb mirror of the embodiment shown in FIG. 3 with only the smaller central mirror in metering position for spot measurement.
Figure 5:
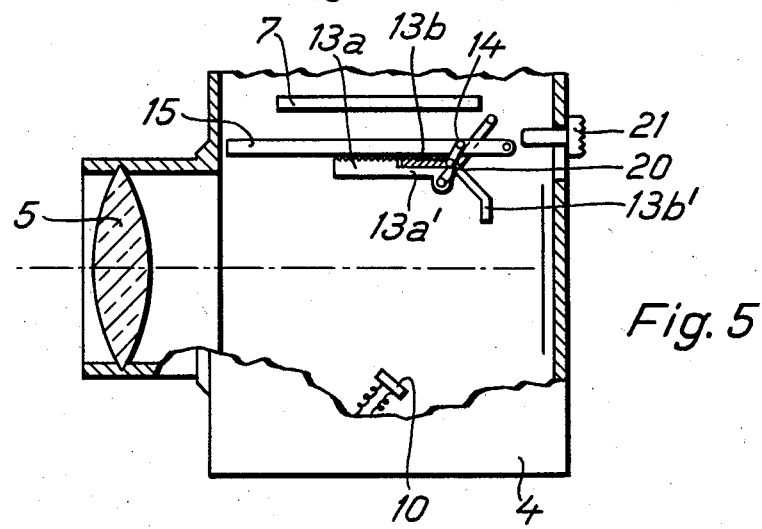
FIG. 5 shows the honeycomb mirror of the embodiment shown in FIG. 3 in the picture-taking position.

As regards the embodiment shown in FIGS. 3 through 5, honeycomb mirror 13 consists of two parts, a smaller and centrally mounted part 13a and a larger one, 13b, which surrounds in the manner of a U the smaller mirror 13a. This division in two allows selective spot-metering or an enlarged spot-measurement.

The two mirrors are mounted on the same shaft 14 which extends from the sides of the frame of the reflex mirror 15. The lever arm 13a' of the smaller mirror 13a carries a further shaft 20 around which the larger mirror 13b is pivotable separately from the smaller one 13a. To this end the larger mirror 13b has an arm 13b' which extends to the rear of the camera housing where it is in driving connection with a shift member 21. The shift member 21 protrudes through the housing wall and may, on the outside, be actuated by the photographer.

The user may, after flipping mirror 15 into the viewing position, keep the small part 13a alone of the honeycomb mirror in front of the film plane. To this end the larger part 13b is pivoted against the back side of the reflex mirror 15 by depressing the shift member 21 as shown in FIG. 4. Thus a pure spot measurement may be carried out, in which approximately less than 10% of the image field is metered. But the user may also selectively release the shift member 21, thereby flipping both mirror parts together in front of the shutter as shown in FIG. 3, whereupon he obtains a partial integrated reading covering about 10% to 50% of the image field. This, however, is only shown by way of example. The honeycomb mirror(s) may also be moved out of the beam path in some other manner.

FIG. 5 shows the reflex mirror 15 together with both mirror parts 13a; 13b in the picture-taking position.

Figure 6:
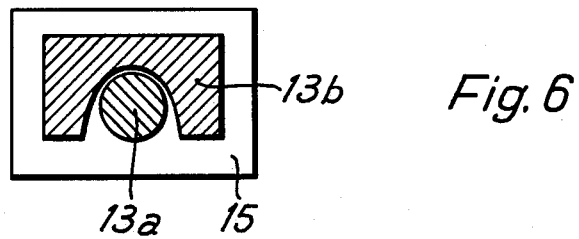
FIG. 6 is a front view which schematically shows the metered image field for the embodiment of the honeycomb mirror of FIG. 3.

FIG. 6 shows the two mirror parts 13a and 13b in elevation in front of the image aperture. It is clearly shown that the small mirror part 13a is mounted approximately centrally, the larger mirror part 13b surrounding it like a U. The smaller part-mirror covers about 6% of the entire image area, and both parts together about 30%.

While a diffuse plane reflecting surface might also be used to measure the mean illumination of a given metering area by means of a comparatively small photodetector, such a diffuse white surface would scatter the light in all directions, that is, the ratio of object-brightness to be square of the f/number, which indicated the illumination at the photodetector, would be very poor.

Obviously, the honeycomb mirror of the invention may be roughened somewhat so as to allow deviation from the precise design of the honeycomb mirror.

We claim:

1. In a single lens reflex camera having a housing, said housing being provided with an objective located along an optical axis and an exposure meter including a photosensitive element adapted to receive light through said objective, said housing being further provided with pivot means and a reflex mirror having one end pivoted on said pivot means; said reflex mirror having a semi-transparent area along said optical axis, said reflex mirror upwardly swingable before picture taking, the improvement comprising:

a bipartite honeycomb mirror jointly mounted with said reflex mirror on said pivot means, said honeycomb mirror being located behind said reflex mirror along said optical axis and in front of the film plane of said single lens reflex camera while in metering position, and being upwardly swung together with said reflex mirror before picture taking.

2. The camera of claim 1, wherein said bipartite honeycomb mirror comprises a first smaller part mounted approximately centrally and used for spot-metering, and a second larger part surrounding said smaller first part in a U form formation and selectively operable in conjunction with said first smaller part, whereby an enlarged spot reading performed by both mirror parts together of about 10 to 50% of the entire image field is achieved.

3. The camera of claim 1, wherein each part of said bipartite honeycomb mirror comprises a plurality of curved mirror elements, said elements slanted so that the center of each individual element reflects principal rays toward said photosensitive element, said elements having a curvature so that outermost peripheral rays from said objective are reflected from the rims of said elements toward said photosensitive element.

4. The camera of claim 1, wherein each part of said bipartite honeycomb mirror is provided with a slightly diffuse and reflecting surface.

5. The camera of claim 1, wherein each part of said bipartite honeycomb mirror has one end pivoted independently on said pivot means.

6. The camera of claim 1, wherein a shaft means for pivotally bearing said bipartite honeycomb mirror is attached to said reflex mirror and a lever gearing is provided for upwardly swinging said bipartite honeycomb mirror together with said reflex mirror.

7. In an optical system for the metering of illumination in mirror reflex photographic camera having an optical axis, an objective, a reflex mirror and a film plane located along said optical axis and a photodetector with a light-sensitive surface small in comparison to the image area to be metered, said photodetector mounted in the lower camera space, the improvement comprising:

a bipartite honeycomb mirror comprising a plurality of curved mirror elements mounted behind said reflex mirror, said reflex mirror partly transmitting, said bipartite honeycomb mirror when in the metering position being located in front of said film plane and being moved together with said reflex mirror out of the way of said optical axis before a picture is taken, said mirror elements of said bipartite honeycomb mirror being slanted so that the center of every individual element reflects principal rays toward said photodetector, said elements being curved so that the outermost peripheral rays from said objective are reflected from the rims of said elements toward said photodetector.

* * * * *